United States Patent
Chen et al.

(10) Patent No.: US 10,671,842 B2
(45) Date of Patent: Jun. 2, 2020

(54) METHODS OF DETERMINING HANDEDNESS FOR VIRTUAL CONTROLLERS

(71) Applicant: Google LLC, Mountain View, CA (US)

(72) Inventors: Shiqi Chen, Mountain View, CA (US); Rong Liu, Mountain View, CA (US); Rohit Pandey, Mountain View, CA (US); Marie White, Mountain View, CA (US); Xue Wang, Mountain View, CA (US); Pavlo Pidlypenskyi, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 159 days.

(21) Appl. No.: 15/882,309

(22) Filed: Jan. 29, 2018

(65) Prior Publication Data
US 2019/0236344 A1    Aug. 1, 2019

(51) Int. Cl.
| | |
|---|---|
| G06F 3/00 | (2006.01) |
| G06K 9/00 | (2006.01) |
| G06K 9/62 | (2006.01) |
| G06F 3/0346 | (2013.01) |
| G06K 9/32 | (2006.01) |
| G06F 3/01 | (2006.01) |
| G06K 9/66 | (2006.01) |
| G06T 7/00 | (2017.01) |

(52) U.S. Cl.
CPC .......... *G06K 9/00355* (2013.01); *G06F 3/011* (2013.01); *G06F 3/017* (2013.01); *G06F 3/0346* (2013.01); *G06K 9/00671* (2013.01); *G06K 9/3233* (2013.01); *G06K 9/6256* (2013.01); *G06K 9/6273* (2013.01); *G06K 9/66* (2013.01)

(58) Field of Classification Search
CPC .................................. G06K 9/00; G06F 3/00
USPC ........................................... 382/103; 348/169
See application file for complete search history.

(56) References Cited

U.S. PATENT DOCUMENTS

| | | | |
|---|---|---|---|
| 2013/0278504 A1* | 10/2013 | Tong ................... | G06K 9/00355 345/158 |
| 2017/0161555 A1 | 6/2017 | Kumar et al. | |
| 2018/0024641 A1* | 1/2018 | Mao ........................ | G06T 7/251 382/103 |

(Continued)

OTHER PUBLICATIONS

International Search Report and Written Opinion for International Application No. PCT/US2019/013218, dated Apr. 4, 2019, 20 pages.

(Continued)

*Primary Examiner* — Abolfazl Tabatabai
(74) *Attorney, Agent, or Firm* — Brake Hughes Bellermann LLP

(57) ABSTRACT

In at least one aspect, a method can include generating a respective set of training set of images for each label in a handedness model by: receiving the label at an image capturing device, obtaining a set of captured images by recording a pass-through image of a user placing a target object within an overlay of a bounding area animation, the target object corresponding with the label, and associating the label with each image in the set of captured images. The method includes training, using the training images, the handedness model to provide a correct label for an input image.

21 Claims, 10 Drawing Sheets

(56) References Cited

U.S. PATENT DOCUMENTS

2019/0183591 A1* 6/2019 Johnson ............... A61B 34/25

OTHER PUBLICATIONS

Keene, "SDK Boy Building a Daydream Controller Based App from Scratch", Dec. 31, 2016, retrieved on Mar. 27, 2019 from: http://www.sdkboy.com/2016/12/building-daydream-controller-based-app-scratch/, 18 pages, XP055574981.

Pandey, "Real-time Egocentric Gesture Recognition on Mobile Head Mounted Displays", 31st Conference on Neural Information Processing Systems (NIPS 2017), Dec. 13, 2017, 4 pages, XP080843531.

Francis, "Object Detection with TensorFlow", retrieved on Dec. 5, 2017 from https://www.oreilly.com/ideas/object-detection-with-tensorflow, Oct. 25, 2017, 15 pages.

\* cited by examiner

US 10,671,842 B2

METHODS OF DETERMINING HANDEDNESS FOR VIRTUAL CONTROLLERS

TECHNICAL FIELD

This description relates to detecting handedness of virtual controllers used in virtual reality (VR) systems.

BACKGROUND

Making users believe that they can interact with a virtual environment is important to user experience in a VR system. Users typically interact with a real environment using their hands, and to replicate this in the virtual environment, the VR system uses a controller, which can relay location and orientation information to the VR system, which uses different models, e.g., elbow model, arm model, etc., to render the user's arms/hands in the virtual environment. The VR system needs to know which hand is holding the controller to select the correct model, which is conventionally done by having the user manually provide information on the hand in which the user will be holding the controller.

SUMMARY

Implementations provide systems and methods for real-time egocentric handedness detection and localization for a VR system. Implementations use a handedness neural network to determine in real-time which hand the controller is in, allowing the user to switch hands with the controller without having to tell the VR system that such a switch has taken place. In addition to determining handedness, i.e., which hand currently holds the controller, the handedness neural network can also recognize hand gestures. Implementations include systems and methods for generating training examples for the handedness neural network to achieve at least 75% precision.

In at least one aspect, a method can include generating a respective set of training set of images for each label in a handedness model by: receiving, at an image capturing device, the label obtaining a set of captured images by recording a pass-through image of a user placing a target object within an overlay of a bounding area animation, the target object corresponding with the label, and associating the handedness label with each image in the set of captured images; and training, using the training images, the handedness model to provide a correct label for an input image.

In at least another aspect, a system can include at least one processor, and a memory storing a training set generation engine configured to generate a respective set of training set of images for each label in a handedness model, by: receive, at an image capturing device, the label, obtain a set of captured images by recording a pass-through image of a user placing a target object within an overlay of a bounding area animation, the target object corresponding with the label, and associate the handedness label with each image in the set of captured images; and train, using the training images, the handedness model to provide a correct label for an input image.

In at least another aspect, a computer-readable medium storing a neural network trained to predict which hand is holding a controller in an image, the neural network trained by: generating a plurality of annotated training images by, for each hand: obtaining a set of captured images by recording a pass-through image of a user placing a target object within an overlay of a bounding area animation, the target object corresponding with the label, obtaining a set of captured images by recording a pass-through image of a user placing a hand holding the controller in an overlay of a bounding area animation, receiving a gesture label for the set of captured images, and associating the gesture label with each image in the set of captured images; and training the neural network with the plurality of annotated training images until the neural network correctly predicts a gesture label given the respective image.

The details of one or more implementations are set forth in the accompanying drawings and the description below. Other features will be apparent from the description and drawings, and from the claims.

DETAILED DESCRIPTION

One or more of the implementations of the subject matter described herein can be implemented so as to realize one or more of the following advantages. As one example, the handedness neural network enables the VR system to detect handedness in real-time. This enables the VR system to switch the location and orientation models when the user switches hands with the controller, resulting in the ability of the VR system to portray a more accurate virtual environment without the use of additional expensive hardware, which lowers the cost of the VR system components without sacrificing immersion. As another example, the VR system more accurately reflects the real environment in the virtual environment, which increases the feeling of immersion and improves the user experience. As another example, implementations provide an environment for generating a large (e.g., at least hundreds of thousands), diverse set of training examples for egocentric handedness and/or hand gestures, which increases the quality of the handedness neural network. As another example, the handedness neural network may run efficiently on modern mobile CPU's, eliminating the need for expensive or specialty hardware.

Figure 1:
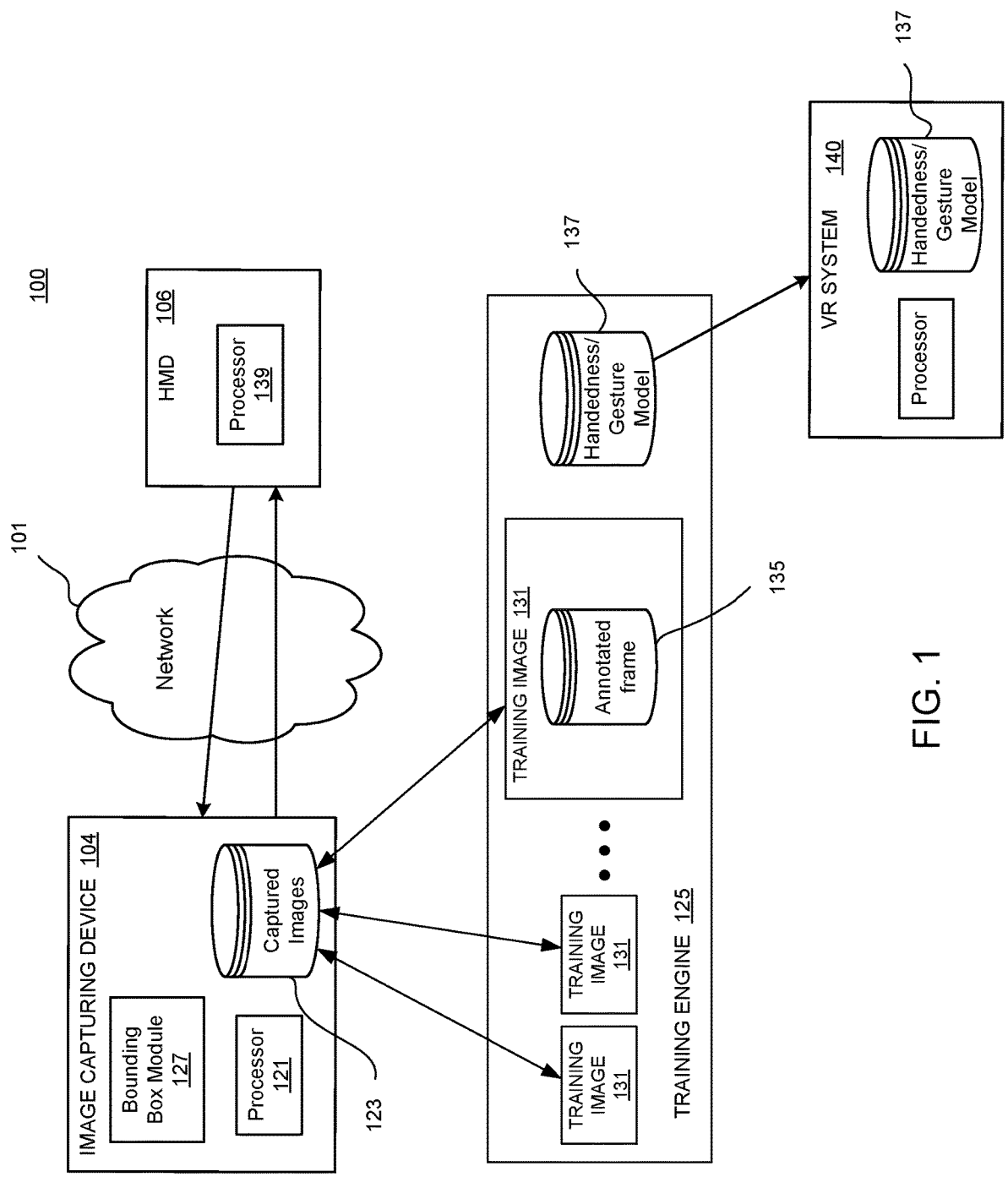
FIG. 1 illustrates an example system in accordance with example implementations.

FIG. 1 is an example system 100 to determine correct handedness of a controller in accordance with an example implementation. The system 100 may be used to collected captured images via an image capturing device 104 and generate annotated training images used to train a handedness neural network, i.e., a machine-learned model, to predict a correct handedness label for a controller 112 (shown in FIG. 8). The image capturing device 104 and a head-mounted device (HMD) 106 may be used to in combination to generate a series of annotated captured images, each captured image being an image of a target object, e.g., a user's hand or a user's hand holding the controller or making a specific gesture, and a bounding area. The image capturing device 104 may also obtain a handedness label for the captured images. The handedness label may represent a handedness-gesture label, e.g., the user makes the gesture with the hand that corresponds with the label while placing the hand in the moving bounding area during the recording.

The image capturing device 104 may generate thousands of different captured images under varying lighting conditions and environments, providing large number (e.g., hundreds of thousands) of training examples, which increases the quality of the resulting neural network. A training engine 125 may receive the captured images and the handedness (or gesture) label and generate training examples by associating the label with corresponding captured images. The training engine 125 uses the training examples to train and test the handedness neural network. The handedness neural network may also be referred to as a handedness model, e.g., a machine-learned handedness model 137. Because the systems and methods result in a trained model to predict handedness, the systems and methods can be used to distinguish controllers held in a user's right hand and/or left hand, and thus, possible to map the controllers to different position and orientation models (e.g., elbow model, arm model) for different functionalities.

Although for ease of discussion FIG. 1 illustrates a handedness model 137, implementations are not limited to handedness and can be used to train a handedness/gesture model, which predicts not only handedness but also a hand gesture in a given image.

Referring to FIG. 1, the example system 100 may include the image capturing device 104 and the HMD 106 communicating via a network 101. In some implementations, the image capturing device 104 may be attached to the HMD 106. In the illustrated implementation, the image capturing device 104 may be facing the real world to capture images. Hence, the user can see a digital pass-through of an outward facing image capture device 104 via the HMD 106.

The image capturing device 104 may include a processor 121 formed in a substrate configured to execute one or more machine executable instructions or pieces of software, firmware, or a combination thereof. The processor 121 can be semiconductor-based—that is, the processor 121 can include semiconductor material that can perform digital logic. The image capturing device 104 can also include an operating system and one or more computer memories, for example a main memory, configured to store one or more pieces of data, either temporarily, permanently, semi-permanently, or a combination thereof. The memory may include any type of storage device that stores information in a format that can be read and/or executed by the one or more processors. The memory may include volatile memory, non-volatile memory, or a combination thereof, and store modules, e.g., bounding area module 127, that, when executed by the one or more processors, perform certain operations. In some implementations, the modules may be stored in an external storage device and loaded into the memory of system 100.

The image capturing device 104 may capture images 123, which can be stored in a database or other memory. The captured images 123 may be used to train the handedness model 137 to determine handedness of the controller 112. More specifically, the captured images 123 may be used to generate a set of training images 131 along with a label, which the image capturing device 104 obtains from the user, e.g., either before or after the images 123 are captured. Once the images 123 are captured and stored, the captured images 123 may be an overlay of a bounding area and a pass-through image of the user's hand, e.g., holding a controller. The bounding area may be generated by a bounding area module 127. The bounding area module 127 may control the bounding area overlay. The bounding area module 127 may operate with the image capturing device 104 to generate a mixed reality environment in which the user can see the pass-through image and view the bounding area generated by the bounding area module 127 overlaid on the pass-through image. In some implementations, the bounding area module 127 may overlay an animated bounding area that moves randomly across the field of view. In other words, the bounding area may be moving so as to increase coverage area of the training images, in order to obtain more dataset collection. For example, a sequence of the bounding area may move in a zig-zag trajectory. The zig-zag trajectory may also be referred to as a bounding area animation. In some implementations, the sequence may be repeated until sufficient training images are recorded. For example, a number of sequences of the zig-zag trajectory can be performed at least three times to obtain sufficient and accurate dataset.

The bounding area may have any shape that accommodates the hand of the user. For example, the bounding area may have a shape of a box (referred herein also as a bounding box). The bounding area may have a shape of a circle (e.g., referred to as a bounding sphere), or an oval, etc.

The user may view the moving bounding area a couple of times so that the user becomes familiar with the movement. Once the movement is learned, the user places the hand with the controller inside the bounding area while the device records the movement. In some implementations, before the device records the movement the user provides a label that indicates which hand is placed in the bounding area. In some implementations, the label may also indicate what gesture the hand performs while placed in the bounding area. In some implementations, the label may be provided after the device records the movement.

The training engine 125 may obtain captured images 123 and corresponding labels from one or more image capturing devices 104. In other words, several (e.g., 10, 25, etc.) separate image capturing devices 104 may generate different sets of captured images 123 and corresponding labels. The training engine 125 may thus receive several different sets of captured images 123 with respective labels. The different users may capture the images 123 under different lighting conditions and in different environments, which makes the resulting neural network more robust. The training engine 125 annotates the captured images 123 with the corresponding label (e.g., the label provided by the user) to generate training images 131.

In some implementations, the training engine 125 collects a large number of recorded frames to determine the type of handedness and/or gesture. For example, the training engine 125 may collect over 400,000 of annotated frames with both handedness (or gesture) labels and bounding areas. Due to the large collected and recorded number of annotated frames, the system may be capable of making an accurate prediction of the correct handedness and/or gesture.

When sufficient training images 131 are obtained and recorded, the training engine 125 may then train a handedness neural network, i.e., the handedness model 137, to predict a handedness label for an image, e.g., an image in which the controller 112 appears. In some implementations, the trained handedness model 137 may include an object detection model, which generates a feature map for each image to predict bounding area location and handedness labels. After the model is trained for handedness, the trained model is pushed to a VR System 140. Like the HMD 106, the VR System 140 may also include an outward facing image capture device, which feeds a module of the VR System 140 images of the real world, e.g., such as those illustrated in FIGS. 3A-3D. The VR System 140 provides these outward facing images, to the trained handedness model 137, and the handedness model 137 provides a handedness label for each provided image to correctly label the controller(s) 112. Because the system now has the proper handedness label with regard to the respective controllers, the controller held by the user's right hand may be labeled right-handed controller and the controller held by the user's left hand may be labeled left-handed controller. This, in turn, enables the VR system 140 to detect handedness in real-time in order to select the correct location and orientation models to re-create the user's hand functions when the user switches hands with the controller, resulting in the ability of the VR system to portray a more accurate virtual environment without the use of additional and/or expensive hardware.

Figure 2A:
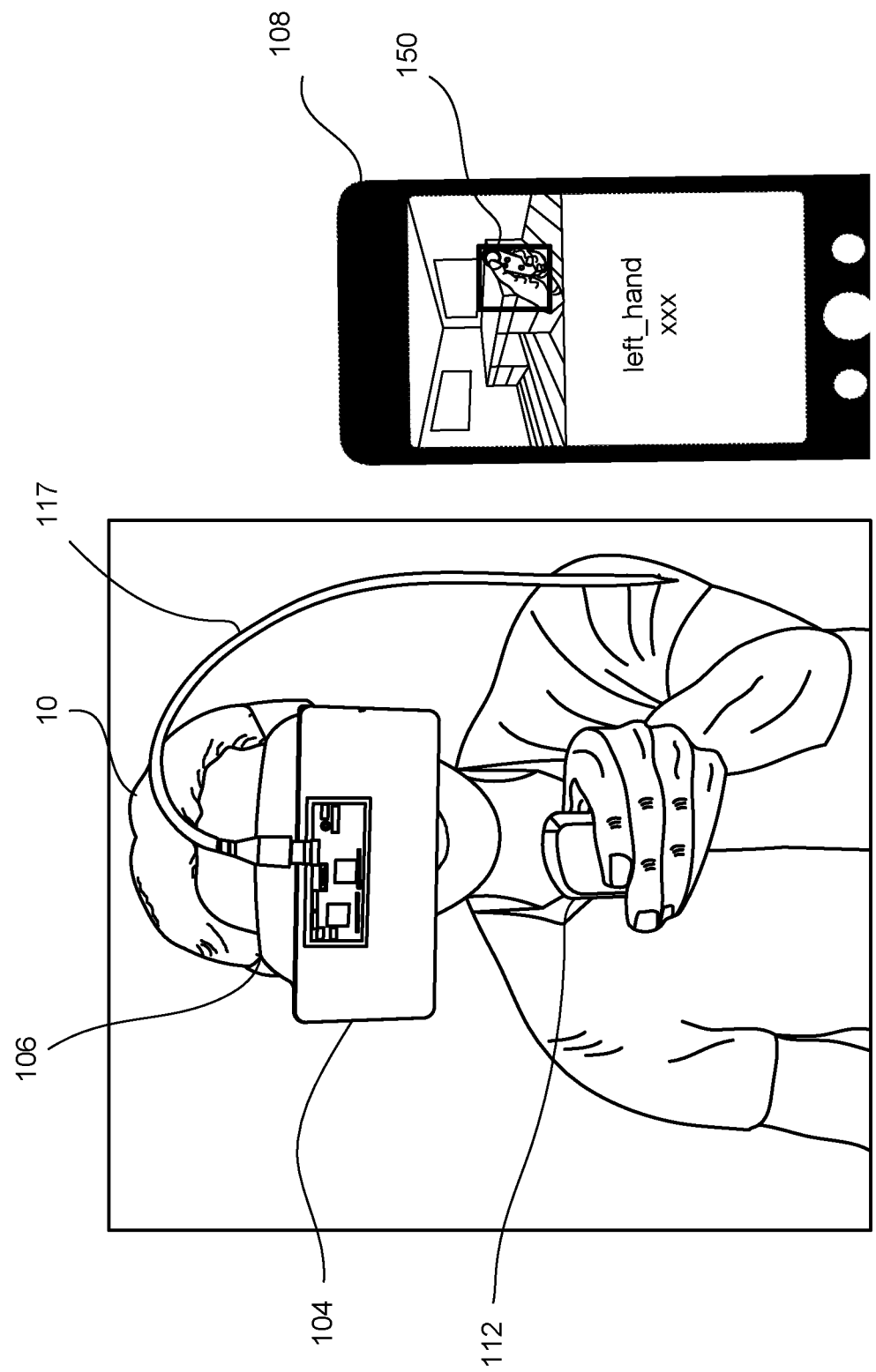
FIG. 2A illustrates a third person view of a system for determining handedness of a left-handed controller in accordance with example implementations.
Figure 2B:
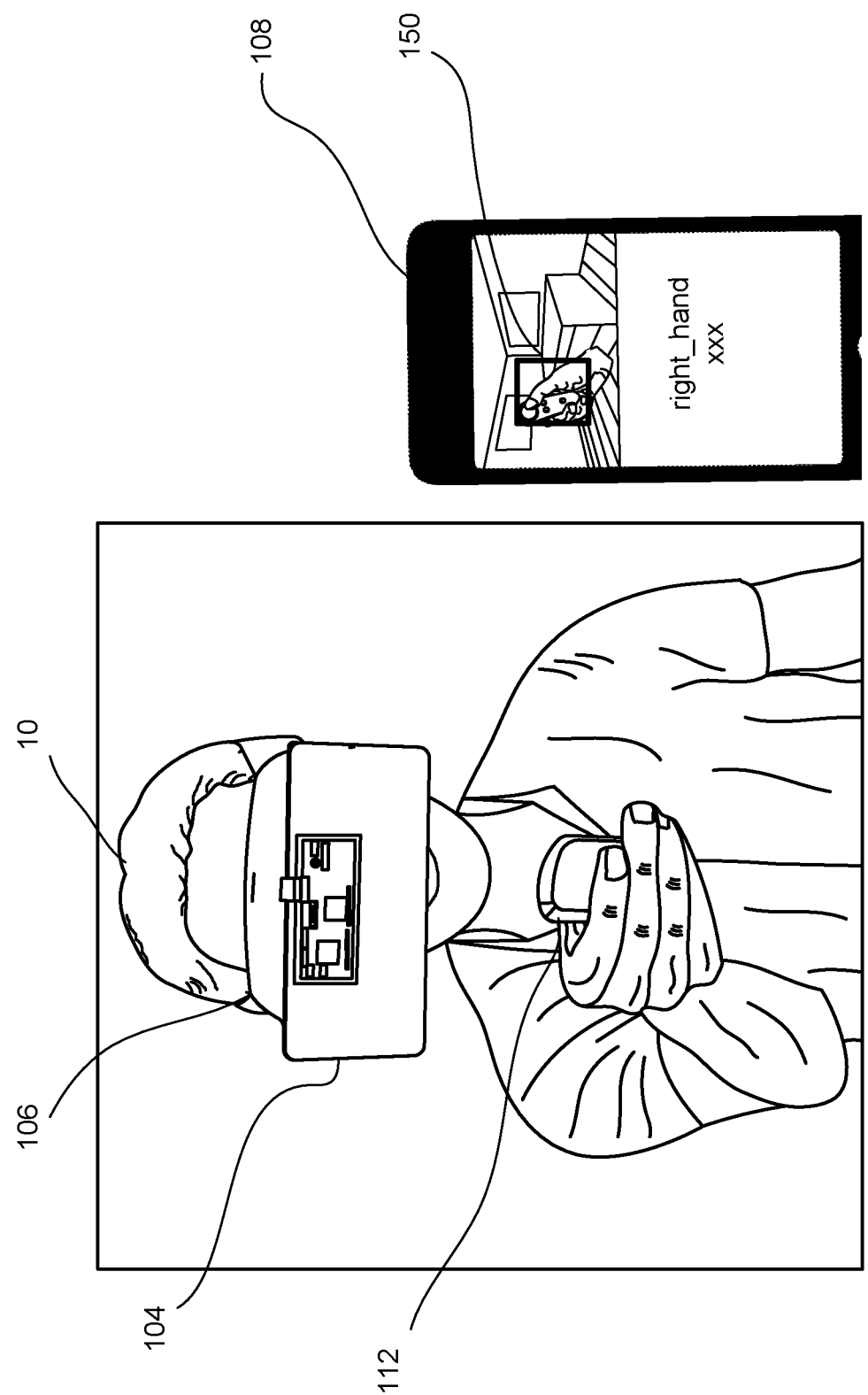
FIG. 2B illustrates a third person view of a system for determining handedness of a right-handed controller in accordance with example implementations.

FIGS. 2A and 2B illustrate third person views of a system of determining handedness of a controller in accordance with example implementations. FIG. 2A illustrates a user employing a left-handed controller and FIG. 2B illustrates a user employing a right-handed controller.

As shown in FIGS. 2A and 2B, the user 10 wears the HMD 106 which may include the image capturing device 104 to capture still and moving images. In some implementations, the image capturing device 104 may be attached to the HMD 106. The combination of the HMD 106 and the image capturing device 104 is a mixed reality device, which can add virtual elements to images of the real environment. For example, the HMD 106 and image capturing device 104 may be a smart phone and a monochrome USB camera connected to the smart phone that is outward facing, both of which are used in a VR application. The image capturing device 104 may record a video stream used to generate training images for training a handedness gesture neural network to determine handedness of controller 112. In the illustrated implementation, the image capturing device 104 may be facing the real world to capture images. As a result, in the HMD 106, the user can see a digital pass-through from the outward facing image capture device 104, and hence view the real world while in a VR environment.

In some implementations, the image capturing device 104 may help track a physical location of the user and/or the controller 112 in the real world, or physical environment relative to the VR environment, and/or may be displayed to the user on the display in a pass through mode, allowing the user to view a mixed virtual environment and physical environment (real world), e.g., allow the user to view the virtual environment and return to the physical environment without removing the HMD 106 or otherwise changing the configuration of the HMD 106.

In some implementations, a mobile device 108 can be placed and/or connected to the HMD 106, to illustrate what the user sees while wearing the HMD 106. In the illustrated implementation, the mobile device 108 may be connected to the HMD 106 via a wire 117 (as shown in FIG. 2A). The mobile device 108 can include a display device that can be used as the screen for the HMD 106. For illustrative purpose, as shown in the display of the mobile device 108, a setting of the environment as viewed by the user via the HMD 106 is an office environment, as shown in FIG. 2A. In some implementations, the mobile device 108 can include hardware and/or software for executing the VR application. In some implementations, the HMD 106 can provide full tracking of location and user movements within six degrees of freedom (6 DOF). The tracking can be based on user hand movements, head movements, eye movements, or tracking of controllers moving based on user input.

Additional devices are possible and such devices may be configured to be substituted for one another. In some implementations, the devices can be laptop or desktop computers, smartphones, personal digital assistants, portable media players, tablet computers, gaming devices, or other appropriate computing devices that can communicate, using the network 101, with other computing devices or computer systems.

In the display of the mobile device 108, on top of (overlaying) the video pass-through, a bounding area 150 is shown on a frame of the image. The user's hand (either right-hand or left-hand) may be placed within, e.g., inside of, the bounding area 150 to obtain training images. The methods to annotate the images to train a machine-learning model to predict a handedness label to the controller will be discussed in detail further below.

FIG. 2B is similar to FIG. 2A except that the user is holding the controller 112 in his/her right hand. The mobile device 108 is shown to illustrate what the user sees as viewed from the HMD 106. In this example implementation, there is no wire connecting the mobile device 108 to the HMD 106. In some implementations, the mobile device 108 may be connected to the HMD 106 via wirelessly, e.g., WiFi, Bluetooth, Infrared, etc. In other implementations, there is no mobile device 108 used.

Figure 3A:
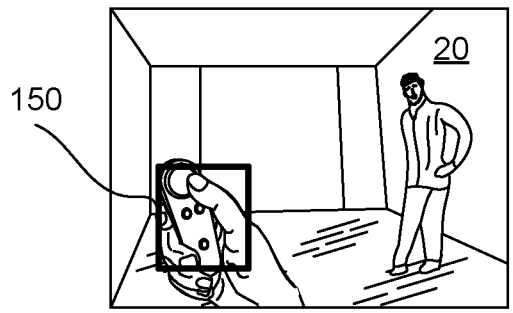
FIGS. 3A-3D illustrate various captured images used to generate training examples in accordance with example implementations.
Figure 3B:
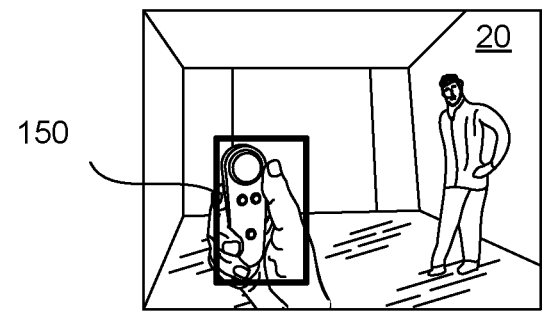
Figure 3C:
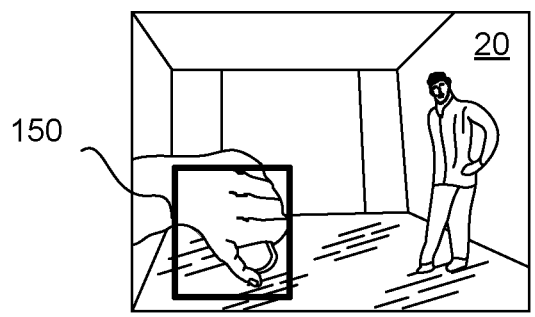
Figure 3D:
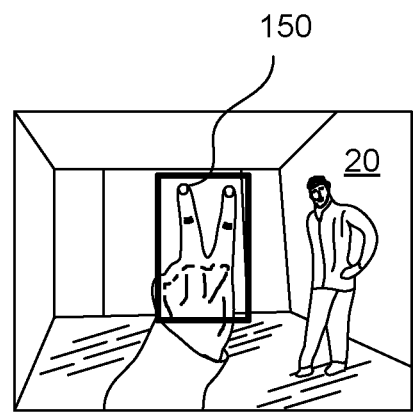

In some implementations, the present systems and methods may also recognize various gestures. For instance, as shown in FIGS. 3A-3D, the various gesture positions of a hand of the user are illustrated in accordance with example implementations. FIG. 3A illustrates a user having a thumb pressed against a controller to identify a pressed thumb gesture. FIG. 3B illustrates a user having a thumb up to identify thumbs up gesture. FIG. 3C illustrates a user having a thumb down to identify thumbs down gesture. FIG. 3D illustrates a user making a peace sign to identify a peace sign gesture. These gestures are merely illustrative, and not to be exclusive.

In the examples of FIGS. 3A-3D, each frame 20 is one frame of a video stream captured by the image capturing device 104. In the illustrated examples, each frame 20 includes a bounding area 150. The bounding area 150 is added in an image capturing space in order for one hand with a particular gesture to be placed within (e.g., inside) the bounding area 150. For each gesture, the user places one hand within the bounding area 150 and the system records images of the hand placed within the bounding area, e.g., as frames of a video, for training images. In some implementations, a location of the bounding area 150 may vary (e.g., move, change) to increase coverage and diversity in the collected training images. For example, the bounding area 150 may move in a zig-zag trajectory which may move substantially across the entire frame 20. This sequence of movement may be repeated until sufficient training images are recorded. In one example implementation, a number of sequences of the zig-zag trajectory can be performed at least three times to obtain a sufficient and accurate dataset. In some implementations, the sequences of movements are replicated with the other hand. For example, once the right hand gestures are recorded, the left hand gestures are recorded and collected for training images.

Further, in order to capture more training images, other sequence trajectories of movements can be used. For example, other trajectories can be a figure-eight sequence, an x-sequence, a side-to-side sequence, an up-and-down sequence, etc. For each gesture, in some implementations, there may be at least three different sequences of trajectories including the sequences previously mentioned.

In some implementations, a size of the bounding area 150 may stay the same for each sequence. In other words, the size of the bounding area 150 may stay the same for the thumb pressed gesture (FIG. 3A), the thumbs up gesture (FIG. 3B), the thumbs down gesture (FIG. 3C) and the peace sign gesture (FIG. 3D).

In some implementations, a size of the bounding area 150 may vary from sequence to sequence. For example, using the thumb pressed gesture of FIG. 3A, when moving in a zig-zag sequence, the size of the bounding area 150 is one size, while the size of the bounding area 150 moving in a side-to-side sequence can be a second size (e.g., smaller) and the size of the bounding area 150 moving in an up-and-down sequence can be a third size (e.g., larger). Each of these sequences may be used for each gestures (e.g., thumbs up gesture, thumbs down gesture, and peace sign gesture)

Figure 4:
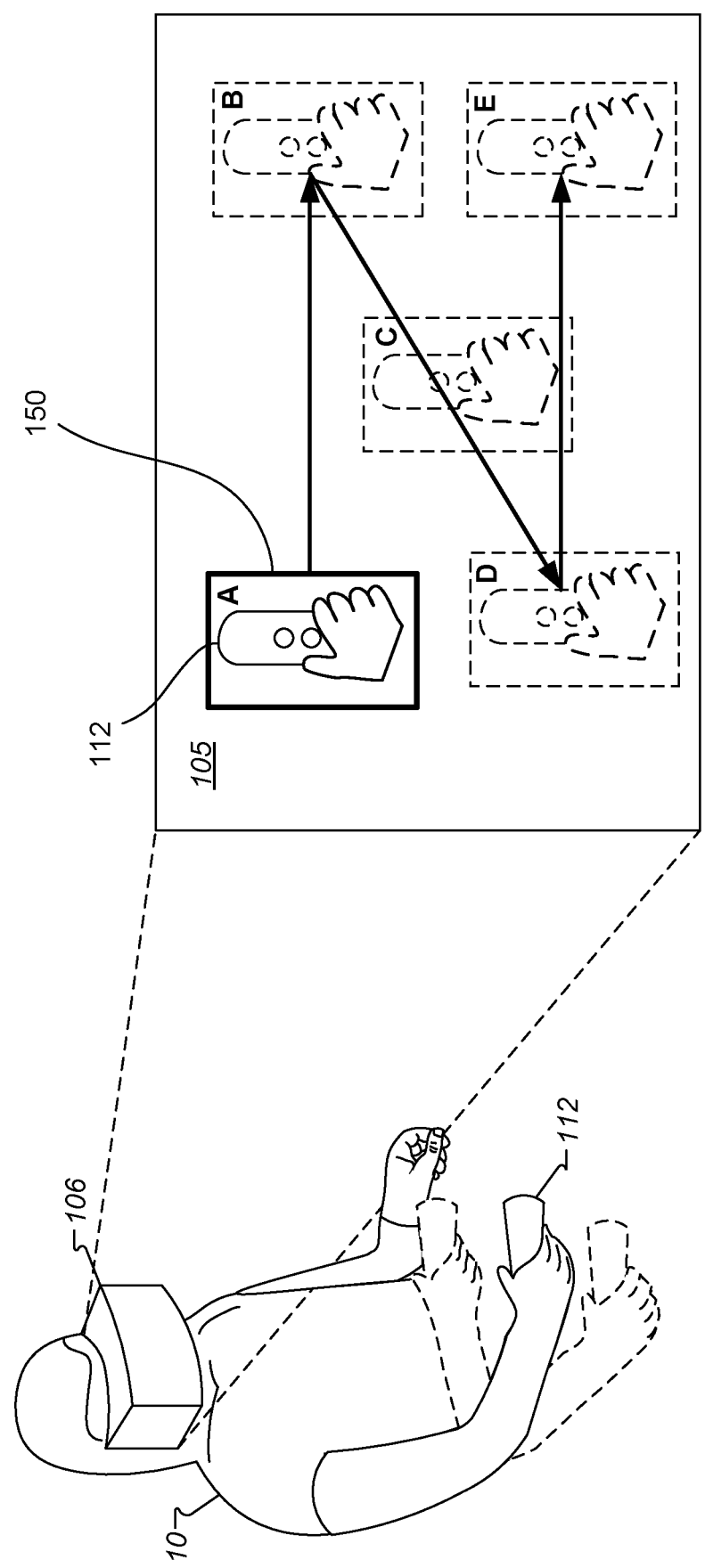
FIG. 4 illustrates a portion of a system for generating training examples according to an example embodiment.

FIG. 4 illustrates a bounding area 150 changing locations based on a trajectory as seen by the user 10 viewed through the HMD 106, according to an example embodiment. In the example of FIG. 4, the system is recording and collecting data for a right-hand of the user.

As shown in FIG. 4, when the user moves the controller 112 held in the user's hand, the user may view, in display 105, the controller 112 correspondingly moving in the display. Further shown in the display 105 is the bounding area 150 that is pre-generated to move in a trajectory. In some implementations, the movement of the bounding area may be generated by a module (not shown) that overlays an animation of the bounding area moving in a trajectory. The trajectory of the bounding area 150 may be sufficient to cover the entire frame of the image. This ensures that the dataset of captured images includes large coverage of potential environments, e.g., positions within the display. While the bounding area 150 is stationary, the user places his/her hand within (e.g., inside) the bounding area 150 to be recorded. As the bounding area 150 moves, the user continues to place the hand within the bounding area 150 relying on natural hand-eye coordination to follow the movements.

In some implementations, the bounding area may move in a pre-defined trajectory in order to reduce time for collection of dataset. In other words, the trajectory of the bounding area may be predictable and easy to remember (e.g., predictable pattern movements) so that as the bounding area moves from one location to a new location the user can follow the bounding area 150 as it moves across the display 105. For example, the bounding area may have a trajectory that moves in a zip-zag configuration. As illustrated in FIG. 4, the bounding area may commence at location A, next move to locations B, C, and D, and end at location E, which shows a zig-zag configuration. This trajectory may be repeated under different environmental conditions, e.g., different lighting, different backgrounds, etc., until sufficient images for the dataset has been collected.

In some implementations, there may be other trajectories employed such as, for example, a figure eight configuration, an x-shaped configuration, up-and-down, side-to-side, etc. In some implementations, different users may be asked to record different trajectories. In some implementations, different trajectories may be used for different hands and/or different gestures. In some implementations, the user may be asked to perform multiple trajectories for each hand.

In some implementations, the bounding area may not be moving in a pre-defined trajectory. In other words, rather than the user viewing the bounding area moving in a pre-defined trajectory, the bounding area may move at different random locations. More specifically, the bounding area may appear at one location and then at different locations, while the user attempting to place the hand in the bounding area, until sufficient dataset of captured images is obtained. The captured dataset should be sufficient to cover the entire frame of the image.

Figure 5:
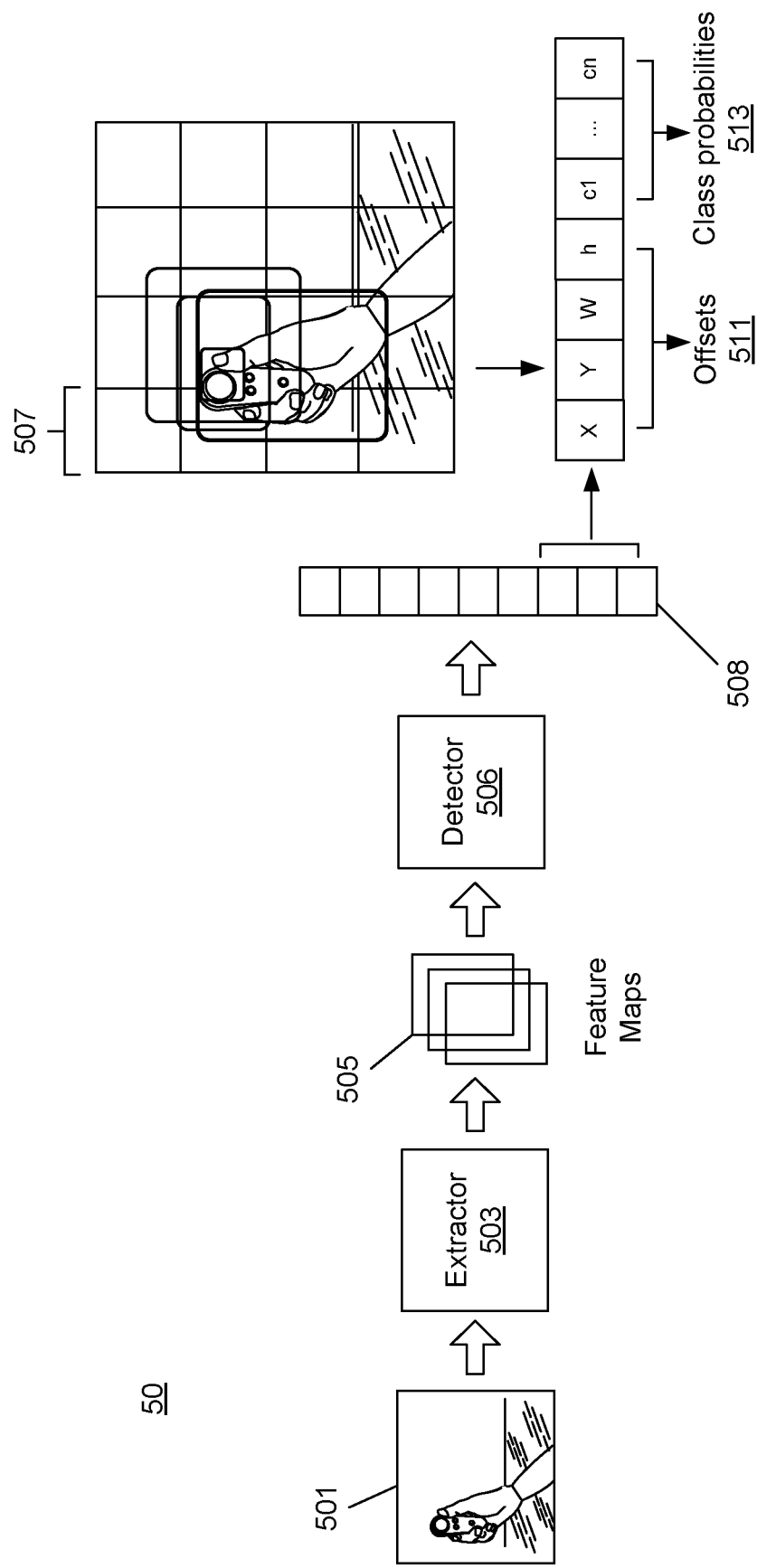
FIG. 5 is a block schematic diagram of an example model architecture in accordance to example implementations.

FIG. 5 is a block schematic diagram of an example model architecture 50 in accordance to example implementations. The architecture 50 is an example of the handedness model 137 illustrated in FIG. 1. In the example of FIG. 5, the handedness neural network has already been trained, in which an input image 501 does not include a bounding area. In the example of FIG. 5, the architecture 50 includes two main parts, e.g., an extractor 503 and a detector 506. In some implementations, the extractor 503 and the detector 506 may be based on models of a Tensor Flow Object Detection API. The extractor 503 may be a neural network that produces feature maps 505 from the input image 501. One example of extractor 503 may be MobileNet developed by Howard et al., which is available in the Tensor Flow Object Detection API. The extractor 503 may receive the input image 501 and may produce extracted feature maps 505. The detector 506 may take the extracted feature maps 505 and output a vector 508. In an example implementation, the vector 508 is a simple vector that can contain output for all bounding areas. The length of vector 508 may be a number of anchor areas multiplied by offsets 511 and class probabilities 513. Thus, the vector 508 contains output for all bounding areas. The detector 506 may predict offsets 511 and class probabilities 513 for each anchor area. The detector 506 may be a multi-area detector configured to predict bounding area location and gesture labels, such as the single-shot detection (SSD) network available in the Tensor Flow API. For each anchor area in a head of the detector 506, the model may predict four offset values (e.g., X, Y, W, h) of the bounding area and a probability for each class label (e.g., c1 . . . cn). In an example implementation, the labels can represent, left hand, right hand, or gestures, such as thump up, thumb down, peace, associated with each hand. The class probabilities 513 can be of variable length, in which the length depends on how many class labels the system wants to detect. In other words, the number of class labels is dependent on how the handedness neural network is trained. For example, when the handedness neural network is trained to predict only left hand or right hand, the detector 506 provides three class probabilities, one for right hand, one for left hand, and a "none" class. When the handedness neural network is trained to predict four gestures (e.g., thumb press, thumb down, thumb up, and peace), the detector 506 provides nine class probabilities, i.e., four distinct gestures multiplexed with either "left" or "right" hand, and one "none" class. Once the model has provided the offsets and class probabilities for each bounding area, the system selects the bounding area with the highest confidence in label prediction.

In the illustrated implementation, the input image 501 can be divided into cell division 507 at one scale. For example, the cell division may be divided as 16×16. In other implementations, the input image 501 can be divided into other cell size at different scales, such as, for example, 8×8, 32×32, 64×64, etc. For each cell after division, there may be several hard-coded proposals on the object bounding area (illustrative by the different aspect ratio). The model at first may identify which cell at which division level, with which hard-coded bounding area proposal, matches the object adequately. Then the model attempts to refine the hard-coded bounding area proposal to reflect the true bounding area of the object.

Figure 6:
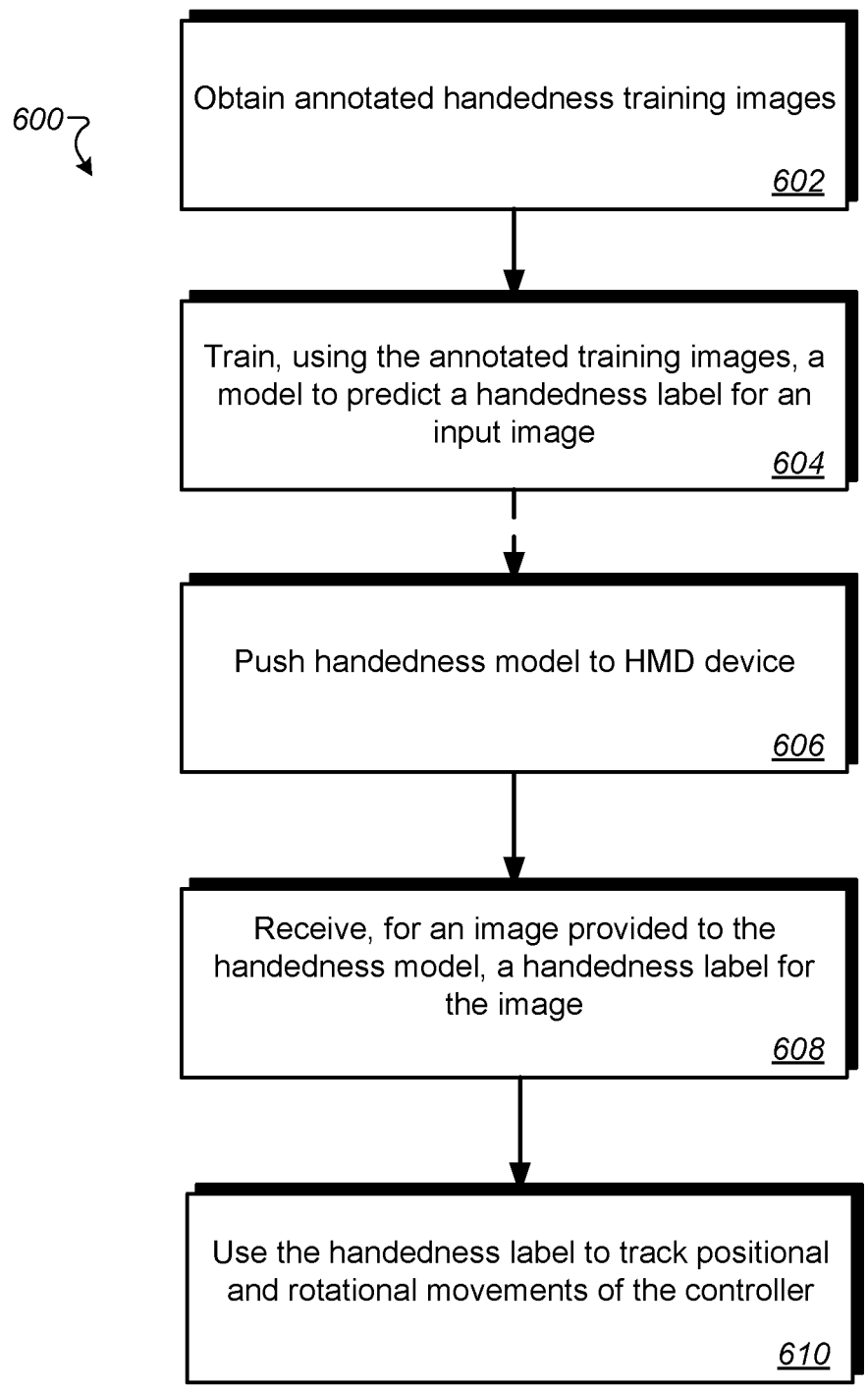
FIG. 6 is a flow diagram of an example process for training and using a handedness neural network in accordance with example implementations.

FIG. 6 is a flow diagram of an example process 600 for training and using a handedness neural network in accordance with example implementations. Process 600 is performed by a system such as system 100 of FIG. 1. Process 600 may begin with the system obtaining annotated handedness training images (602). The annotated training images may be obtained by recording a mixed-reality video as the user places a target object within an animated bounding area, as explained in more detail with regard to FIG. 7. In some implementations, the target object may be a particular hand (right-hand or left-hand) placed within the bounding area to obtain the handedness prediction. In some implementations, the system may obtain gestures predictions, e.g., by having the user make the gesture while the hand is placed within the bounding area. When sufficient annotated training images are obtained and recorded, the system may then train a model to predict a handedness label for a provided image, e.g., an image of a controller in the user's hand (604). In some implementations, the trained model may be based on an SSD-MobileNet architecture, where a feature map is generated for each image from which the model predicts bounding area location and handedness (and optionally gesture) labels. After the model is trained for handedness, the model is ready for use in an inference mode, i.e., to provide labels for input images. The input images may be provided to the model by a VR system. Accordingly, to reduce lag time and reliance on network connectivity, the trained model is pushed to a VR system, such as VR system 140 of FIG. 1 (606). The VR system 140 may then receive, for an image provided to the trained model, a handedness label for the image to correctly label the controller(s) (608). The image provided to the trained model may be from a real-time view of an outward facing camera that is part of the VR system. In some implementations, the input image may include only one target object, e.g., one hand holding one controller. In such implementations the handedness model may be used to provide a single label. In some implementations the input image may include two target objects, e.g., a first controller held in a first hand and a second controller held in a second hand. In such implementations, the handedness model may be used to provide two labels, one for the first controller and one for the second controller. Of course in some implementations the VR system may access the trained model via a network, e.g., the Internet, so step 606 may be optional and step 608 may be performed at a server rather than at the VR system. In such an implementation, the VR system may provide the input image to the server and may receive the label from the server. Because the system now has the proper handedness label with regard to the respective controllers, the controller held by the user's right hand is labeled right-handed controller and the controller held by the user's left hand is labeled left-handed controller (610). In some implementations, the systems may use the label to properly track positional and rotational movements of the controller so as to map proper models (e.g., elbow model, arm model). In other implementations, the systems may provide the correct handedness label per controller and give different functionalities. For example, in a painting program (e.g., TiltBrush), the user can assign a palette to the controller held in the left hand and a paint brush to the controller held in the right hand, each controller having different functionalities.

Figure 7:
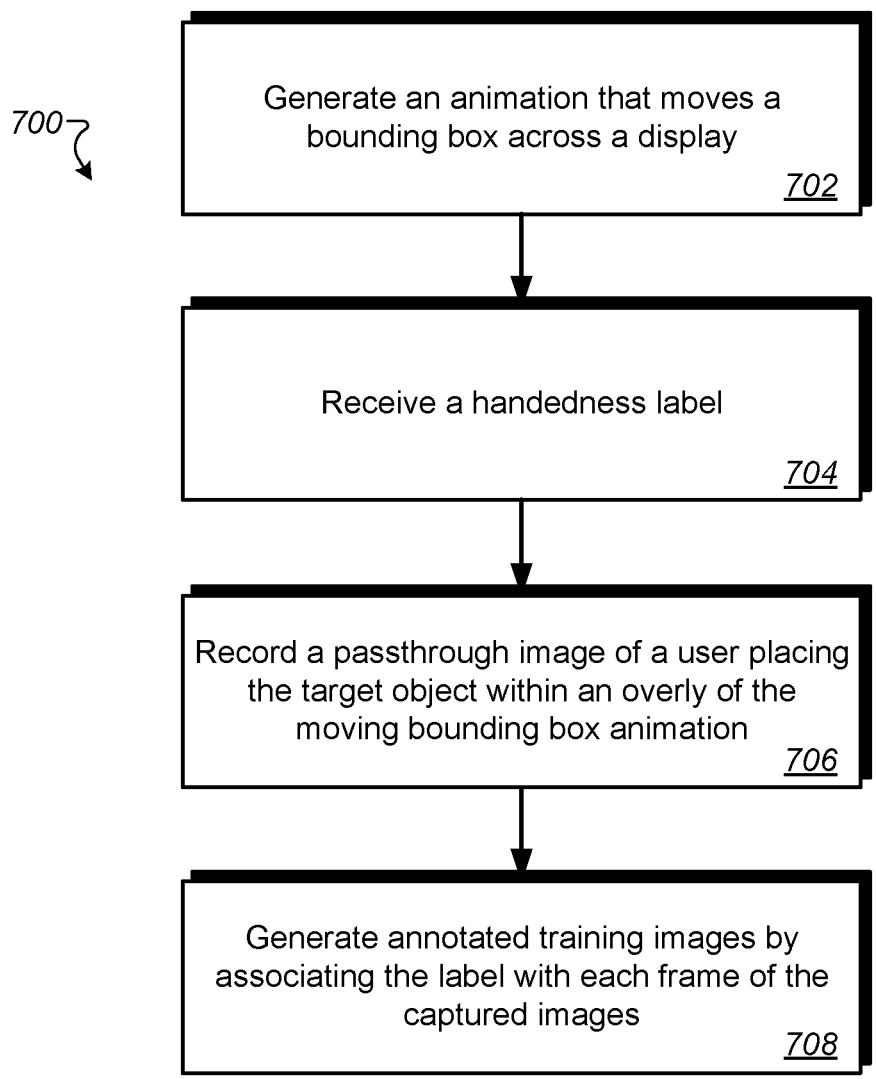
FIG. 7 is a block diagram of an example process of generating training examples for training a handedness neural network in accordance to example implementations.

FIG. 7 is a flow diagram of an example process 700 for labeling a target object with a corresponding handedness controller in accordance to example implementations. Process 700 may be performed as part of step 602 of FIG. 6. Process 700 illustrates the collection of one set of annotated training images, but it is understood that process 700 would be repeated many times, e.g., by different users, with different hands/gestures, under different conditions, to generate a training dataset that results in a robust model. Thus, process 700 may be repeated several times, by several different users, under different conditions and with different hands and gestures. Process 700 may begin with the system generating an animation video that moves a bounding area across a display of a HMD (702). In some implementations, the bounding area may be moving so as to increase coverage and collect more training images. For example, a sequence of the bounding area may move in a zig-zag trajectory. Once generated, the system may play the animation several times for the user to watch, so the user if familiar with the trajectory. In some implementations, the user may use a device to start and stop the sequence of trajectory. For example, the user may employ a clicker to signal the start and stop of each data collection sequence. Prior to recording the training images, the system may receive a handedness label (704). In some implementations, the system may inform the user what particular type of target object to record, e.g., handedness or handedness and gesture. In some implementations, the user may provide the label, e.g., may inform the image capturing device which hand (left hand or right hand) the user will be placing within the bounding area. In some implementations, the user may also inform the image capturing device what type of gesture (e.g., thumb pressed, thumbs up, thumbs down, or peace sign) the user will provide. The system may then record the target object while the bounding area is moving, the user placing the target object within the moving bounding area during the recording (706). Because the user has previously watched the bounding area move in a pre-defined trajectory, the user may easily predict the movement of the bounding area. In some implementations the user may provide the label for the recording after the recording completes. In other words, step 704 may occur after step 706. The system generates a training example by associating the label with the recording. Each frame of the recording is associated with the label. Each frame of the recording thus includes a bounding area and a label. The bounding area tells the neural network the ground-truth of where in the image the object of interest occurs and the label tells the neural network what the ground-truth label for the image is. The ground truth represents what is actually represented by the image, i.e., the correct handedness or the correct handedness and gesture, of the object of interest. The system may repeat steps 702-706 until sufficient training images are recorded. For example, a number of sequences of the zig-zag trajectory can be performed at least three times per user and/or per label to obtain sufficient and accurate dataset. The annotated training images are used to teach the neural network to identify the object of interest in an input image and to provide a label for the object (708). The label can be handedness, i.e., which hand appears in the image, or handedness and a gesture, depending on what labels are used to train the network. During training, the neural network uses the ground truth to adjust weights in an objective function so that, over several (e.g., thousands, hundreds of thousands, or even millions) of iterations of training, the neural network more often than not predicts a correct label for an object of interest. The more often the prediction is correct, e.g., reflects ground truth, the higher the quality of the model. In some implementations, some of the annotated training images may be reserved for evaluating the quality of the model. For example, some (e.g., a fourth, a sixth, an eighth) of the training images may be kept back and not provided during training so that the images may be used to test the model. Because these images have an associated label, the quality of the model can be determined and training can continue until the quality reaches a desired level.

An illustrative example follows, although implementations are not limited to the numbers and parameters discussed. In this example, the training dataset may include a large number of annotated frames, e.g., over 400,000 annotated frames. The annotations include both handedness (or handedness and gesture) labels and bounding areas. In some implementations, some of the annotated training mages may be used for evaluation. For example, the set of training images can include 342,000+ annotated frames and the set of evaluation images can include 64,000+ frames. The annotated training images may be obtained from several (e.g., 20, 30, 40) different users in several (e.g., 20, 30, 40) different scenes (backgrounds, lighting, etc.). The training images may be obtained using the systems and processes described herein. The image size may be 320×240 and of one single color channel, although other image sizes can be used. The system may use a batch size of 32 and may augment the training dataset using random data augmentation including brightness and contrast perturbation and random crop and padding.

TABLE 1, illustrates the performance of the trained model when benchmarked on a mobile device, e.g., running on SnapDragon™ 821 chipset. As TABLE 1 illustrates, the gesture detection pipeline can run as fast as 27 frames-per-second sustainably. At this rate, the gesture detection can be performed in real-time. Higher accuracy, shown as Precision in TABLE 1, can be achieved with different models, but at the cost of total latency.

TABLE 1

| Model | Depth multiplier | Precision | Inference latency (ms) | Total latency (ms) |
|---|---|---|---|---|
| MobileNetSSD-25% | 0.25 | 76.15% | 31.8504 | 36.1658 |
| MobileNetSSD-50% | 0.5 | 77.43% | 77.4913 | 81.6922 |
| MobileNetSSD-100% | 1 | 80.94% | 265.2109 | 269.4694 |

Figure 8:
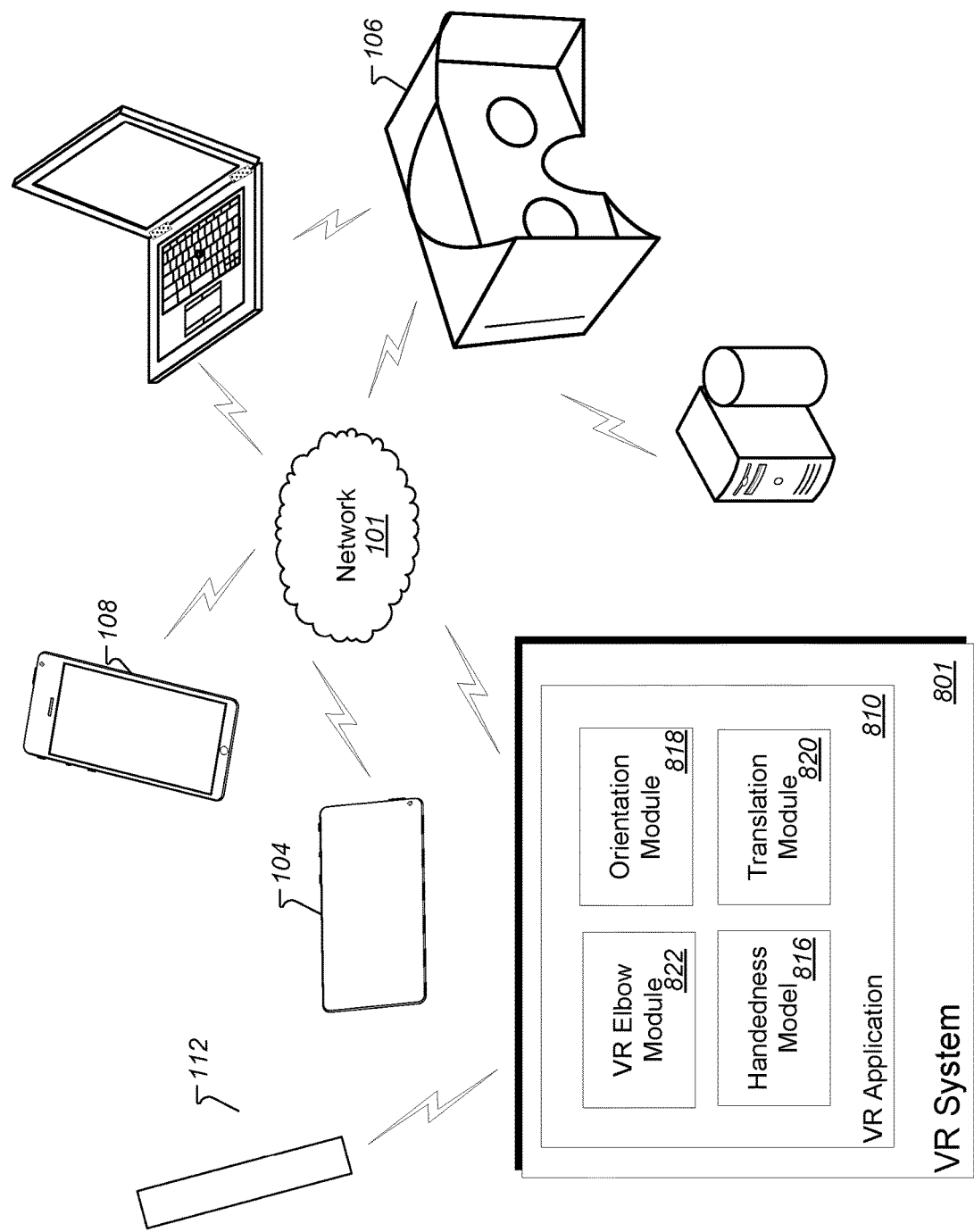
FIG. 8 is block schematic diagram of an example virtual reality (VR) system for interacting with a three-dimensional (3D) VR environment in accordance to example embodiments.

FIG. 8 illustrates a diagram of an example virtual reality (VR) system 801 for interacting with a three-dimensional (3D) VR environment in accordance with the teachings of this disclosure is shown. FIG. 8 is an example of VR system 140 in FIG. 1. In general, the system 801 may provide the VR environment, and VR content that enable a person (e.g., a user, a wearer, etc.) to access, view, use and/or interact with the VR environment. The VR system 801 can provide the user with options for accessing the content, applications, virtual objects, real objects, and VR controls. The example VR system 801 may include the user 10 wearing the HMD 106, and having the handheld controller 112.

As shown in FIG. 8, the VR application 810 may include a handedness module 816, an orientation module 818, a translation module 820, and a VR elbow module 822. The VR application, or portions thereof, can be included in the controller 112, the HMD 106 and/or the VR system 801.

From collected captured images via the image capturing device 104, the handedness module 816 may generate annotated training images used to train a machine-learning model to predict correct handedness label to the controller 112. The handedness module may recognize a handedness label for the received images, and push the handedness label to the HMD 106. Because the systems and methods result in a trained model to predict handedness, the handedness module 816 can be used to distinguish the controller 112 is being held in the right hand or the left hand. As a result, this ensures it may be possible to map the controller 112 to different position and orientation models and perform different functionalities. In some implementations, the handedness module 816 may be incorporated in the HMD 106.

The orientation module 818 may access, for example, one or more inertial measurement units (IMUs), light sensors, audio sensors, image sensors, distance/proximity sensors, locational sensors and/or other sensors to determine an orientation of the controller 112 in the real world, or physical environment relative to the virtual environment. In some implementations, the orientation module 818 may be incorporated in the controller 112. In some implementation, the orientation module 818 may be configured to, via the sensor(s), determine an orientation of the controller 112. In other implementations, the orientation module 818 may access, for example, one or more inertial measurement units, light sensors, audio sensors, image sensors, distance/proximity sensors, locational sensors and/or other sensors to track a physical location of the HMD 106 in the real world, or physical environment relative to the virtual environment. In some implementations, the orientation module 818 may be incorporated in the HMD 106. In some implementation, the orientation module 818 may be configured to, via the sensor(s), determine the location of the HMD 106.

In some implementations, the handedness module 816 and/or the orientation module 818 may be included in the controller 112 and/or the HMD 106. In some implementations, operations of the handedness module 816 and/or the orientation module 818 may be executable in the controller 112 and/or the HMD 106.

The orientation module 818 may access any number of memory storage and/or sensors described herein to determine particular orientations of the controller 112, users, virtual objects, and areas associated with moving objects within the VR environment. For example, the orientation module 818 may determine the orientation and rotation (e.g., 6 DOF) of the controller 112.

Once the orientation module 818 determines the orientation of the controller 112, the translation module 820 may translate the movement of the controller 112 into the VR environment. In some implementations, the translation module 820 may translate movements of the controller 112 based on 6 degrees of freedom (6 DOF) of movements.

The VR elbow module 822 may produce an elbow model. In some implementations, the translation module 820 may use the elbow model produced by the elbow module 822 and use the information from the orientation module 818 and the elbow module 822 to produce a virtual location and/or orientation of the virtual controller.

In some implementations, the handedness module 816, the orientation module 818 and/or the translation module 820 can allow the controller 112 to interact with virtual objects. The controller interaction can be interpreted as a physical gesture (e.g., movement) to be carried out on the virtual objects. For example, the user can then operate the virtual controller to point or touch an object. Such movements can be performed and depicted with 6 DOF movements.

The example VR system 801 may include any number of computing and/or electronic devices that can exchange data over a network 101. The devices may represent clients or servers, and can communicate via the network 101 or any other additional and/or alternative network(s). Example client devices include, but are not limited to, the HMD 106, the controller 112, the image capturing device 104, the mobile device 108 (e.g., a smartphone, a personal digital assistant, a portable media player, etc.), a laptop or netbook, a desktop computer, an electronic tablet (not shown), a gaming device (not shown), and any other electronic or computing devices that can communicate using the network 101 or other network(s) with other computing or electronic devices or systems, or that may be used to access VR content or operate within a VR environment. The devices may represent client or server devices. The devices can execute a client operating system, and one or more client applications that can access, render, provide, or display VR content on a display device included in or in conjunction with each respective device.

The VR system 801 may represent a server device. In general, VR system 801 may include any number of repositories storing content and/or virtual reality software modules that can generate, modify, or execute virtual reality scenes. In the depicted example, VR system 801 includes a VR application 810 that can access and present content and/or controls for system 801. In some implementations, VR application 810 can run locally on at least one of devices 104, 106, 108. The VR application 810 can be configured to execute on any or all of devices 104, 106, 108 and be controlled or operated upon using the controller 112, for example.

Particular implementations described in this disclosure may enable a user to use the controller 112 to interact with the VR environment. For example, the user can hold the controller 112 to select and manipulate virtual objects in 3D in the VR environment. An example controller 112 may include a housing in which internal components of the controller device are received, and a user interface (not shown) on an outside of the housing, accessible to the user. The user interface may include a plurality of different types of manipulation devices including, for example, touch sensitive surface(s) configured to receive user touch inputs, buttons, knobs, joysticks, toggles, slides and other such manipulation devices.

One or more sensors can be included on the controller 112. The sensors can be triggered to provide input to the VR environment, for example, by users accessing the controller 112 and HMD device 106. The sensors can include, but are not limited to, a touchscreen sensors, accelerometers, gyroscopes, pressure sensors, biometric sensors, temperature sensors, humidity sensors, and ambient light sensors. The controller 112 can use the sensors to determine a detected rotation of controller 112 in the VR environment. The rotations can then be used as input to the VR environment. In one non-limiting example, the controller 112 may be incorporated into the VR environment as a stick, a pencil or pen, a drawing tool, a controller, a remote, a laser pointer, a mobile phone, a paintbrush or other object etc. Positioning of the controller 112 by the user when incorporated into (or represented within) the VR environment can allow the user to position particular virtual objects as well as to position stick, paintbrush, pencil or pen, drawing tool, controller, remote, laser pointer, mobile phone, a paintbrush or other object in the VR environment. Such positioning can be used, in some implementations, as a trigger for manipulating objects using anchor points.

The HMD device 106 may represent a virtual reality headset, glasses, eyepiece, or other wearable device capable of displaying virtual reality content. In operation, the HMD device 106 can execute a VR application, which can playback received and/or processed images to a user through a display (not shown) in the HMD device 106. In some implementations, the VR application 810 can be hosted by one or more of the devices 104, 106, and 108.

In some implementations, the example HMD device 106 may include a housing coupled to a frame, with an audio output device including, for example, speakers mounted in headphones. In the example HMD device 106, a display (not shown) may be mounted on an interior facing side of the front portion of the housing. Lenses may be mounted in the housing, between the user's eyes and the display. In some implementations, the HMD device 106 may include a sensing system including various sensors such as, for example, audio sensor(s), image/light sensor(s), locational sensors (e.g., inertial measurement unit including gyroscope and accelerometer), and the like. The HMD device 106 may also include a control system including processors and various control system devices to facilitate operation of the HMD device 106.

In the example system 100, the HMD device 106 can be connected to devices 104 and/or 108 to access VR content on VR system 801, for example. Device 104 or 108 can be connected (wired or wirelessly) to HMD device 106, which can provide VR content for display.

In some implementations, one or more content servers (e.g., VR system 801) and one or more computer-readable storage devices can communicate with the computing devices using network 101 to provide VR content to the devices 104, 106, 108. In some implementations, the network 101 can be a public communications network (e.g., the Internet, cellular data network, dialup modems over a telephone network) or a private communications network (e.g., private LAN, leased lines). In some implementations, the computing devices 104, 106, 108 can communicate with the network 101 using one or more high-speed wired and/or wireless communications protocols (e.g., 802.11 variations, Wi-Fi, Bluetooth, Transmission Control Protocol/Internet Protocol (TCP/IP), Ethernet, IEEE 802.3, etc.).

In some implementations, the mobile device 108 can execute the VR application 810 and provide the content for the VR environment. In some implementations, the laptop computing device can execute the VR application 810 and can provide content from one or more content servers (e.g., VR system 801). The one or more content servers and one or more computer-readable storage devices can communicate with the mobile device 108, laptop computing device, and/or controller 112, using the network 101 to provide content for display in HMD device 106.

Figure 9:
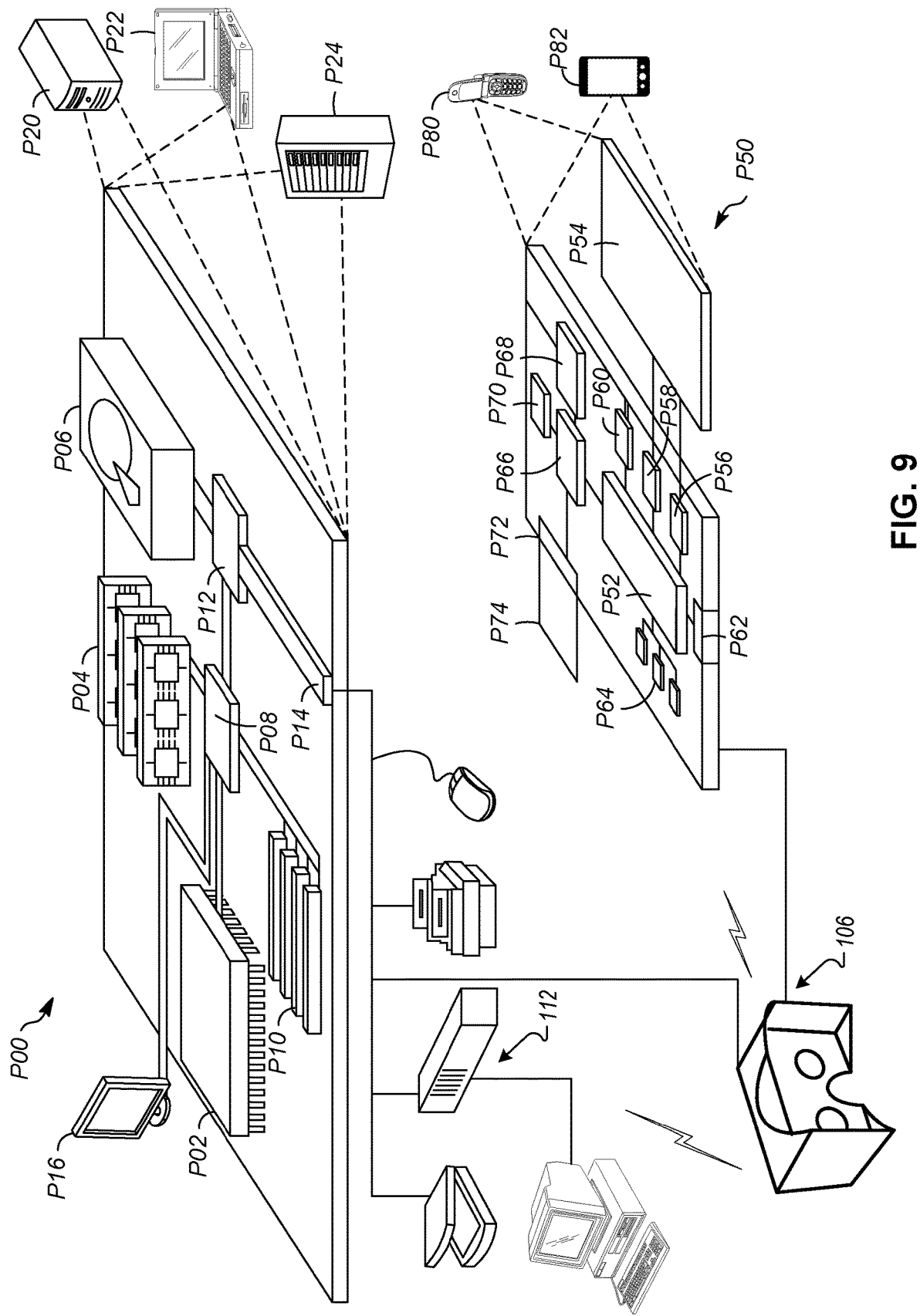
FIG. 9 is a block schematic diagram of an example computer device and an example mobile computer device that may be used to implement the examples disclosed herein.

Referring to FIG. 9, an example of a generic computer device P00 and a generic mobile computer device P50, which may be used with the techniques described here. The computing devices P50 may be used to implement any of the devices disclosed herein including, but not limited to, HMD 106, physical controller 112, devices 102-108, and controller 110. Computing device P00 is intended to represent various forms of digital computers, such as laptops, desktops, tablets, workstations, personal digital assistants, televisions, servers, blade servers, mainframes, and other appropriate computing devices. Computing device P50 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device P00 includes a processor P02, memory P04, a storage device P06, a high-speed interface P08 connecting to memory P04 and high-speed expansion ports P10, and a low speed interface P12 connecting to low speed bus P14 and storage device P06. The processor P02 can be a semiconductor-based processor. The memory P04 can be a semiconductor-based memory. Each of the components P02, P04, P06, P08, P10, and P12, are interconnected using various busses, connections, memories, caches, etc. and may be mounted on a common motherboard or in other manners as appropriate. The processor P02 can process instructions for execution within the computing device P00, including instructions stored in the memory P04 or on the storage device P06 to light-emitting portion graphical information for a GUI on an external input/output device, such as light-emitting portion P16 coupled to high speed interface P08. In other implementations, multiple processors and/or multiple buses may be used, as appropriate, along with multiple memories and types of memory. Also, multiple computing devices P00 may be connected, with each device providing portions of the necessary operations (e.g., as a server bank, a group of blade servers, or a multi-processor system).

The memory P04 stores information within the computing device P00. In one implementation, the memory P04 is a volatile memory unit or units. In another implementation, the memory P04 is a non-volatile memory unit or units. The memory P04 may also be another form of computer-readable medium, such as a magnetic or optical disk.

The storage device P06 is capable of providing mass storage for the computing device P00. In one implementation, the storage device P06 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory P04, the storage device P06, or memory on processor P02.

The high speed controller P08 manages bandwidth-intensive operations for the computing device P00, while the low speed controller P12 manages lower bandwidth-intensive operations. Such allocation of functions is exemplary only. In one implementation, the high-speed controller P08 is coupled to memory P04, light-emitting portion P16 (e.g., through a graphics processor or accelerator), and to high-speed expansion ports P10, which may accept various expansion cards (not shown). In the implementation, low-speed controller P12 is coupled to storage device P06 and low-speed expansion port P14. The low-speed expansion port, which may include various communication ports (e.g., USB, Bluetooth, Ethernet, Wi-Fi) may be coupled to one or more input/output devices, such as a keyboard, a pointing device, a scanner, or a networking device such as a switch or router, e.g., through a network adapter.

The computing device P00 may be implemented in a number of different forms, as shown in the figure. For example, it may be implemented as a standard server P20, or multiple times in a group of such servers. It may also be implemented as part of a rack server system P24. In addition, it may be implemented in a personal computer such as a laptop computer P22. Alternatively, components from computing device P00 may be combined with other components in a mobile device (not shown), such as device P50. Each of such devices may contain one or more of computing device P00, P50, and an entire system may be made up of multiple computing devices P00, P50 communicating with each other.

Computing device P50 includes a processor P52, memory P64, an input/output device such as a light-emitting portion P54, a communication interface P66, and a transceiver P68, among other components. The device P50 may also be provided with a storage device, such as a microdrive or other device, to provide additional storage. Each of the components P50, P52, P64, P54, P66, and P68, are interconnected using various buses, and several of the components may be mounted on a common motherboard or in other manners as appropriate.

The processor P52 can execute instructions within the computing device P50, including instructions stored in the memory P64. The processor may be implemented as a chipset of chips that include separate and multiple analog and digital processors. The processor may provide, for example, for coordination of the other components of the device P50, such as control of user interfaces, applications run by device P50, and wireless communication by device P50.

Processor P52 may communicate with a user through control interface P58 and light-emitting portion interface P56 coupled to a light-emitting portion P54. The light-emitting portion P54 may be, for example, a TFT LCD (Thin-Film-Transistor Liquid Crystal Light-emitting portion) or an OLED (Organic Light-emitting Diode) light-emitting portion, or other appropriate light-emitting portion technology. The light-emitting portion interface P56 may comprise appropriate circuitry for driving the light-emitting portion P54 to present graphical and other information to a user. The control interface P58 may receive commands from a user and convert them for submission to the processor P52. In addition, an external interface P62 may be provided in communication with processor P52, so as to enable near area communication of device P50 with other devices. External interface P62 may provide, for example, for wired communication in some implementations, or for wireless communication in other implementations, and multiple interfaces may also be used.

The memory P64 stores information within the computing device P50. The memory P64 can be implemented as one or more of a computer-readable medium or media, a volatile memory unit or units, or a non-volatile memory unit or units. Expansion memory P74 may also be provided and connected to device P50 through expansion interface P72, which may include, for example, a SIMM (Single Inline Memory Module) card interface. Such expansion memory P74 may provide extra storage space for device P50, or may also store applications or other information for device P50. Specifically, expansion memory P74 may include instructions to carry out or supplement the processes described above, and may include secure information also. Thus, for example, expansion memory P74 may be provide as a security module for device P50, and may be programmed with instructions that permit secure use of device P50. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer or machine-readable medium, such as the memory P64, expansion memory P74, or memory on processor P5 that may be received, for example, over transceiver P68 or external interface P62.

Device P50 may communicate wirelessly through communication interface P66, which may include digital signal processing circuitry where necessary. Communication interface P66 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver P68. In addition, short-range communication may occur, such as using a Bluetooth, Wi-Fi, or other such transceiver (not shown). In addition, GPS (Global Positioning System) receiver module P70 may provide additional navigation- and location-related wireless data to device P50, which may be used as appropriate by applications running on device P50.

Device P50 may also communicate audibly using audio codec P60, which may receive spoken information from a user and convert it to usable digital information. Audio codec P60 may likewise generate audible sound for a user, such as through a speaker, e.g., in a handset of device P50. Such sound may include sound from voice telephone calls, may include recorded sound (e.g., voice messages, music files, etc.) and may also include sound generated by applications operating on device P50.

The computing device P50 may be implemented in a number of different forms, as shown in the figure. For example, it may be implemented as a cellular telephone P80. It may also be implemented as part of a smart phone P82, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, the systems and techniques described here can be implemented on a computer having a light-emitting portion device (e.g., a CRT (cathode ray tube) or LCD (liquid crystal light-emitting portion) monitor) for light-emitting portioning information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, left, right, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Additionally, connecting lines and connectors shown in the various figures presented are intended to represent exemplary functional relationships and/or physical or logical couplings between the various elements. It should be noted that many alternative and/or additional functional relationships, physical connections or logical connections may be present. Moreover, no item or component is essential to the practice of this disclosure unless the element is specifically described as "essential" or "critical". Additionally, the figures and/or drawings are not drawn to scale, but rather are drawn for clarity of illustration and description.

Although certain example methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

What is claimed is:

1. A method, comprising:
    generating a respective set of training images for each label in a handedness model for a virtual reality controller, by:
        receiving the label at an image capturing device,
        obtaining a set of captured images by recording a pass-through image of a user placing a target object within an overlay of a bounding area of a bounding area animation, the target object corresponding with the label, and
        associating the label with each image in the set of captured images; and
    training, using the respective set of training images, the handedness model to provide a correct label for an input image.

2. The method of claim 1, wherein the target object is a hand of the user.

3. The method of claim 1, wherein the target object is a hand of the user and the label represents a handedness-gesture label, wherein the user makes a gesture with the hand that corresponds with the label while placing the hand in the bounding area of the bounding area animation.

4. The method of claim 3, wherein the method includes generating a respective training set of images for each type of gesture of the hand.

5. The method of claim 4, wherein the types of gestures include at least one of thumb pressed, thumb up, thumb down, or peace sign.

6. The method of claim 1, wherein the bounding area animation moves the bounding area in a pre-defined trajectory across a display of the image capturing device associated with a head mounted device.

7. The method of claim 6, wherein the pre-defined trajectory is at least one of a zig-zag sequence, a figure-eight sequence, an x-shaped sequence, an up-and-down sequence, and a side-to-side sequence.

8. The method of claim 6, the method further comprising augmenting the training images using random data augmentation.

9. The method of claim 1, the method further comprising repeating the generating of a respective set of training images for each label under different lighting conditions.

10. The method of claim 1, wherein training the handedness model to assign correct handedness label includes:
    obtaining a predicted bounding area with highest prediction label,
    labeling the target object as right-handed when the predicted bounding area falls within a predicted right-hand bounding area location, and
    labeling the target object as left-handed when the predicted bounding area falls within a predicted left-hand bounding area location.

11. A system comprising:
    at least one processor;
    memory storing a training set generation engine configured to generate a respective set of training images for each label in a handedness model for a virtual reality controller, by:
        receiving, at an image capturing device, the label,
        obtaining a set of captured images by recording a pass-through image of a user placing a target object within an overlay of a bounding area of a bounding area animation, the target object corresponding with the label, and
        associating the label with each image in the set of captured images; and
    memory instructions that, when executed by the at least one processor cause the system to train, using the respective set of training images, the handedness model to provide a correct label for an input image.

12. The system of claim 11, wherein the target object is a hand of the user.

13. The system of claim 11, wherein the target object is a hand of the user and the label represents a handedness-gesture label,
    wherein the user makes a gesture with the hand that corresponds with the label while placing the hand in moving the bounding area of the bounding area animation.

14. The system of claim 13, wherein the respective set of training images is generated for each type of gesture of the hand.

15. The system of claim 13, wherein the bounding area animation moves the bounding area in a pre-defined trajectory, the pre-defined trajectory being at least one of a zig-zag sequence, a figure-eight sequence, an x-shaped sequence, an up-and-down sequence, or a side-to-side sequence.

16. The system of claim 15, wherein a sequence of the pre-defined trajectory is repeated at least three times.

17. The system of claim 11, wherein training the handedness model to assign correct handedness label includes:
    obtaining a predicted bounding area with highest prediction label, labeling the target object as right-handed when the predicted bounding area falls within a predicted right-hand bounding area location, and labeling the target object as left-handed when the predicted bounding area falls within a predicted left-hand bounding area location.

18. A virtual reality system, comprising:

at least one processor;

an outward facing image capture device;

a computer-readable medium storing a handedness neural network trained to predict a label for an input image, the label indicating which hand is holding a virtual controller in the input image; and memory storing instructions that, when executed by the at least one processor, cause the virtual reality system to:

obtain an image from the outward facing image capture device, obtain the label for the input image by providing the input image to the handedness neural network, the handedness neural network providing the label in response to receiving the input image, select an orientation model based on the label, and use the orientation model in rendering a virtual environment.

19. The virtual reality system of claim 18, wherein the virtual reality system further configured to:

obtain images, obtain handedness labels, and select the orientation model in real-time.

20. The virtual reality system of claim 18, wherein the orientation model is a location model or an elbow model.

21. The virtual reality system of claim 18, wherein the image is a first image, the label is a first label, and the orientation model is a first orientation model, and the memory further stores instructions that, when executed by the at least one processor, cause the virtual reality system to:

obtain a second image from the outward facing image capture device;

obtain a second label for the image by providing the second image to the handedness neural network, the handedness neural network providing the second label in response to receiving the second image; and select a second orientation model based on the second label, wherein the virtual reality system begins to use the second orientation model in rendering the virtual environment responsive to selecting the second orientation model.

* * * * *

UNITED STATES PATENT AND TRADEMARK OFFICE
CERTIFICATE OF CORRECTION

PATENT NO.         : 10,671,842 B2
APPLICATION NO.    : 15/882309
DATED              : June 2, 2020
INVENTOR(S)        : Shiqi Chen et al.

Page 1 of 1

It is certified that error appears in the above-identified patent and that said Letters Patent is hereby corrected as shown below:

In the Claims

In Column 20, Claim 13, Line 52, delete "moving the" and insert -- the --, therefor.

Signed and Sealed this
Twenty-first Day of July, 2020

Andrei Iancu
*Director of the United States Patent and Trademark Office*